United States Patent [19]

Ginosar et al.

[11] Patent Number: 5,144,442
[45] Date of Patent: Sep. 1, 1992

[54] WIDE DYNAMIC RANGE CAMERA

[75] Inventors: Ran Ginosar, Nofit; Oliver Hilsenrath; Yehoshua Zeevi, both of Haifa, all of Israel

[73] Assignee: i Sight, Inc., Orangeburg, N.Y.

[21] Appl. No.: 799,666

[22] Filed: Nov. 21, 1991

Related U.S. Application Data

[63] Continuation of Ser. No. 338,547, Aug. 2, 1989, abandoned.

[30] Foreign Application Priority Data

Feb. 8, 1988 [IL] Israel ......................................... 87306

[51] Int. Cl.⁵ ......................... H04N 5/30; H04N 5/14; H04N 5/238
[52] U.S. Cl. .................................... 358/209; 358/166; 358/228; 358/909
[58] Field of Search ................. 358/209, 909, 166, 228

[56] References Cited

U.S. PATENT DOCUMENTS

| | | | |
|---|---|---|---|
| 4,450,482 | 5/1984 | Ackermann | 358/160 |
| 4,584,606 | 4/1986 | Nagasaki et al. | 358/209 |
| 4,614,966 | 9/1986 | Yunoki et al. | 358/44 X |
| 4,647,975 | 3/1987 | Alston et al. | 358/209 |
| 4,926,247 | 5/1990 | Nagasaki et al. | 358/43 |

FOREIGN PATENT DOCUMENTS 3436057 5/1985 Fed. Rep. of Germany.
3641186 7/1987 Fed. Rep. of Germany.

OTHER PUBLICATIONS

Abstract of Japanese Patent Publication No. 59/122288.
Abstract of Japanese Patent Publication 59/122182.
Int. Classification (Section G 06 K, 9/56) 5th Ed., 1989.

Primary Examiner—John K. Peng
Attorney, Agent, or Firm—William H. Dippert; Ronald E. Brown

[57] ABSTRACT

This invention is directed to a wide dynamic range video imaging apparatus. More specifically, the invention is directed to a video imaging apparatus comprising a) a sensor for providing a plurality of video images of a scene at different exposure levels and b) a processor for processing the plurality of video images to produce a combined video image including image information from the plurality of video images by applying neighborhood transforms to the plurality of video images, the processor comprising a selector for locally selecting the operating levels of the dynamic range of the combined video image within the dynamic range of the sensor, whereby the resulting video image includes image information from the plurality of video images with enhanced information content at local areas therein.

10 Claims, 6 Drawing Sheets

WIDE DYNAMIC RANGE CAMERA

This application is continuation of U.S. patent application Ser. No. 338,547, filed Aug. 2, 1989, now abandoned.

FIELD OF THE INVENTION

The present invention relates to video imagery and more particularly to apparatus and techniques for providing enhanced video images.

BACKGROUND OF THE INVENTION

Various types of video image enhancement apparatus and techniques have been proposed. Automatic Gain Control (AGC) techniques have been employed, inter alia, in video signals for reducing the dynamic range of the video signal by subtraction of its DC level. Such a technique is described in U.S. Pat. No. 4,719,350, wherein linear AGC is applied to the video image on a pixel by pixel basis. This technique is applicable only to a solid area which is delimited by a line parallel to the scan direction.

Generally speaking, AGC is employed in video processing only on a frame by frame basis.

SUMMARY OF THE INVENTION

The present invention seeks to provide improved video image enhancement apparatus which overcomes limitations of the prior art apparatus and techniques discussed above.

There is thus provided in accordance with a preferred embodiment of the present invention, video imaging apparatus including apparatus for providing a plurality of video images of a scene at different exposure levels and apparatus for processing the plurality of video images to produce a combined video image including image information from the plurality of video images and including enhanced detail at local areas therein.

Further in accordance with a preferred embodiment of the invention, the apparatus for processing the plurality of video images comprises apparatus for locally enhancing the dynamic range of portions of the combined video image.

Additionally in accordance with a preferred embodiment of the invention, the apparatus for processing the plurality of video images comprises apparatus for preserving edge indicating information in the combined video image.

Further in accordance with an embodiment of the invention, the apparatus for processing the plurality of video images comprises apparatus for applying neighborhood transforms to the plurality of video images.

Additionally in accordance with a preferred embodiment of the present invention, there is provided video image enhancement apparatus comprising apparatus for providing a plurality of video images of a scene at different exposure levels and apparatus for processing the plurality of video images to produce a combined video image including image information from the plurality of video images and including enhanced detail at local areas therein.

Additionally, in accordance with a preferred embodiment of the invention, apparatus for processing may also include image enhancement apparatus such as histogram equalization apparatus.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
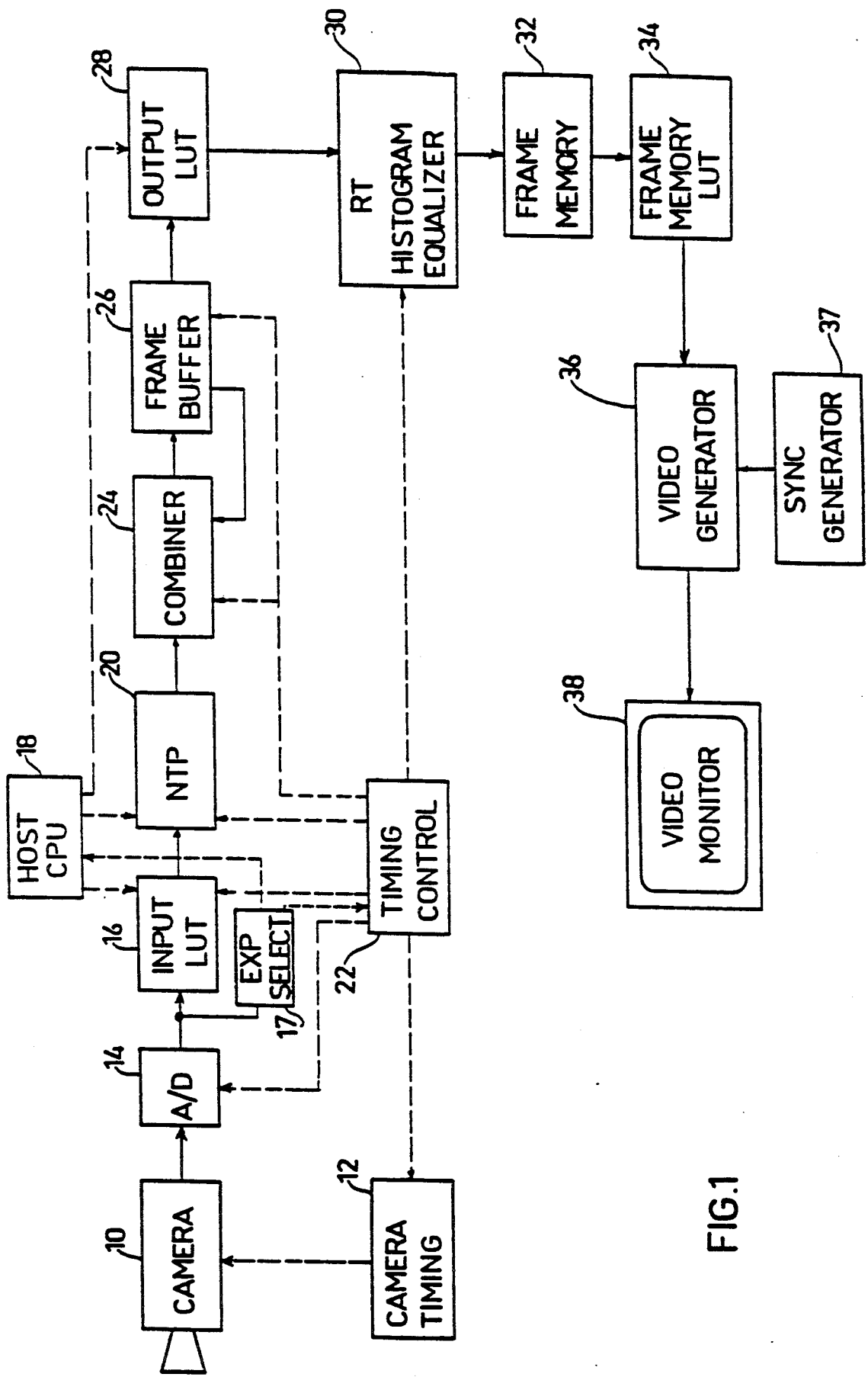
FIG. 1 is a block diagram illustration of a video imaging system constructed and operative in accordance with a preferred embodiment of the present invention.

Reference is now made to FIG. 1, which illustrates one preferred embodiment of a video imaging system constructed and operative in accordance with a preferred embodiment of the present invention and which comprises a camera 10, such as a CCD, CID, photodiode array or any other visible or non-visible light sensor array which permits the exposure time to be varied by externally supplied control pulses or which permits any other form of externalexposure control. One commercially available example of camera 10 is a model RVS-09 available from Xybion Electronic Systems Corp. of San Diego, Calif., U.S.A.

Camera timing circuitry 12 supplies timing pulses to camera 10. The timing circuitry 12 may comprise conventional clocks, counters and frequency dividers. The timing pulses supplied to camera 10 are operative to actuate the photoelectric accumulation of charge in the sensor arrays for varying periods of selectable duration and are also operative to govern the read-out of the signal currents produced by sensing through preamplifier circuits preferably incorporated within camera 10 to an A/D converter 14. A typical suitable A/D converter is a TRW TDC-1048 which operates at 10 MHz at 8 bit resolution. Control of the photoelectric accumulation of charge may be accomplished generally in two ways, by operating a shutter, such as an electronic shutter to control the light input or by controlling the integration time of the sensor array.

Figure 8:
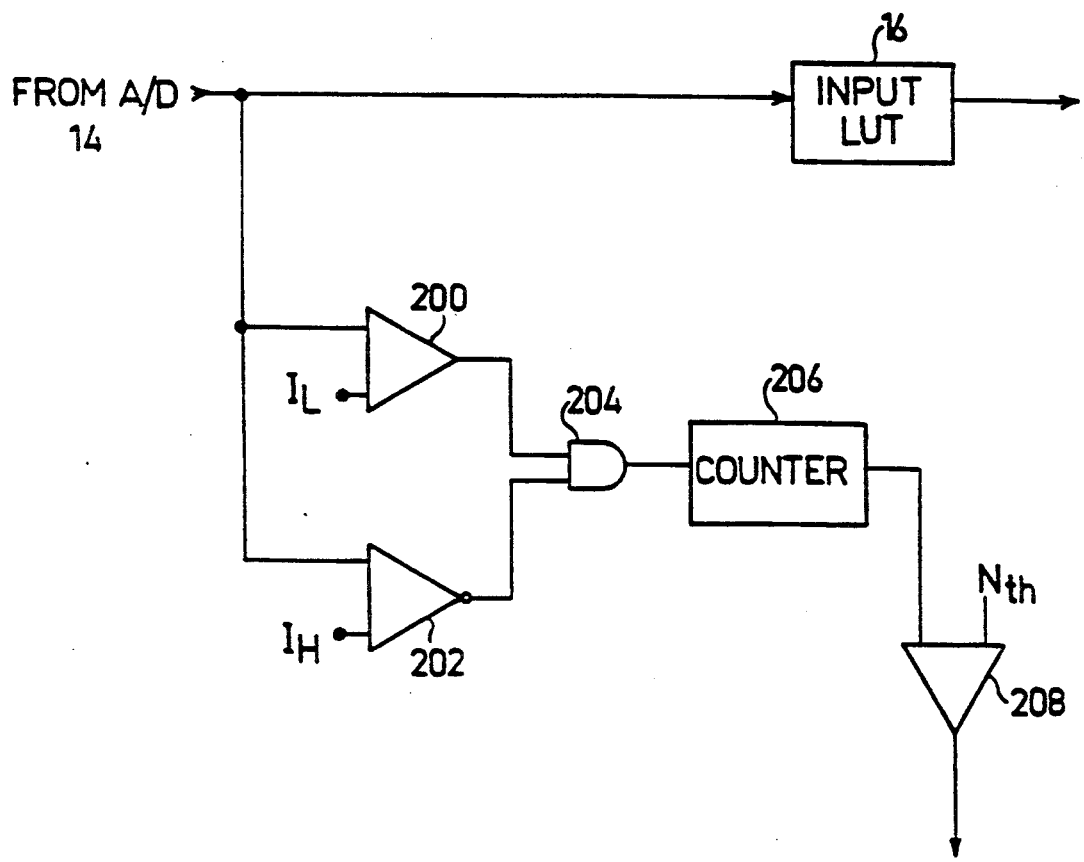
FIG. 8 is a block diagram illustration of an exposure selector forming part of the circuitry of FIG. 1.

The digitized video data from A/D converter 14 is supplied in parallel to two subsystems, a Look Up Table (LUT) 16 and an exposure selector 17. The exposure selector is illustrated in FIG. 8 and comprises first and second comparators 200 and 202 arranged in parallel and outputting to an AND gate 204. Comparator 200 compares the signal from A/D converter 14 with a low threshold level I(L), such as a signal level of 20, in an 8-bit range of 0-255. Comparator 202 compares the signal from A/D converter 14 with a high threshold value I(H), such as 235. If the signal is above 20 and below 235, then the two comparators both generate logic "true" signals which are ANDed by AND gate 204.

The output of AND gate 204 is supplied to a counter 206, for incrementing thereof when two "true" signals are received at AND gate 204.

Counter 206 is reset to zero at the beginning of each frame. If the image of the current frame is mostly saturated, i.e. many pixels are white (having, for example, a digital value of 255 or close thereto), then at the end of the frame the counter will contain a very low number. Such will also be the case, if the image is mostly cut-off, i.e. many pixels are black, (i.e. having a digital value of 20 or less).

Conversely, for "normal" images, which possess a certain spread of values, a large number of the pixels will have values between 20 and 235. For frames of such images, the counter 206 will contain a large number at the end of each frame.

The output of counter 206 is supplied to a comparator 208. At the end of each frame, the output of counter 206 is compared by comparator 208 with a threshold value N(th). This threshold is selected to determine whether the image of the frame was a "normal" one, as opposed to an image that was mainly saturated or cut-off. If the value of the counter 206 output is higher than N(th), then the output of the comparator 208 is a logic "true". That output is supplied to both the timing control circuitry 22 and the host CPU 18 (FIG. 1).

The measurement and determination of whether a certain frame at a given exposure level should or should not be combined with a plurality of frames at different exposure levels may be carried out in at least two ways.

According to one embodiment of the invention, the measurement can be done on a relatively infrequent basis, as determined by the host CPU 18. In such a case, a complete series of exposures, covering the full range of exposures of which the system is capable, is carried out. At the end of each exposure, the output of comparator 208 is received by the host CPU 18.

The host CPU 18 controls the parameters I(L), I(H) and N(th), and can modify them at will. The information gathered assists the host CPU 18 to determine which exposures will be taken or used until the next measurement.

According to an alternative embodiment of the present invention, the measurement can be carried out on a continuous basis. The series of exposures begins from an intermediate exposure setting, such as that determined by a conventional exposure meter, and proceeds towards the two extremes.

For example, it may be is assumed that there exist 15 possible exposure levels, where number 1 is the shortest (having the least sensitivity and number 15 is the longest (having the greatest sensitivity). The system typically proceeds by starting a new sequence with exposure number 7, and then proceeds with numbers 6, 5, . . . 1. When a cut-off frame is encountered, for which comparator 208 produces a logic "false" output, the progression of the sequence in that direction is terminated and the sequence proceeds with exposure numbers 8, 9, . . . 15. When a saturated frame is encountered, the sequence is complete. In such a case, the system may receive exposure numbers 3 through 13, of which exposure numbers 3 and 13 are cut-off and saturated, respectively, and exposure numbers 4-12 are "normal".

It is appreciated that not all of the exposures may be necessary. For example, two consecutive images taken at exposure levels separated by one may be very similar and the amount of information provided by one as compared with the other may be marginal. Such an occurence may be detected by comparing the two consecutive images, pixel by pixel. If the corresponding pixels differ by more than a given threshold then a counter is incremented. If the count over the entire frame exceeds a given threshold, the entire exposure is retained. Otherwise, it may be discarded.

Alternatively, after taking a picture at the i'th level of exposure, a picture at the k'th level is taken and compared with the picture taken at the i'th level, pixel by pixel. If they are different at more than a given number of pixels, then a picture is also taken at the intermediate exposure level j, which is between i and k. While taking the picture at the j'th exposure level the output can be compared with the outputs at both the i'th and k'th levels in order to determine whether any exposure between the j'th level and either the i'th level or the k'th level need be taken.

The foregoing techniques are intended to enable less than the full series of exposures to be employed. Normally one to three exposures are sufficient to provide a desired level of information.

Look Up Table (LUT) 16 pre-processes the digital video signal in accordance with program instructions received from a Host CPU 18. The Host CPU 18 is typically embodied in a personal computer communicating with the system hardware via a conventional serial or parallel link. Alternatively, the Host CPU 18 may be embodied in a relatively simple microcontroller, such as an Intel 8051 or a suitable custom-designed controller. As will be described more fully hereinbelow, the Host CPU defines input and output LUTs, camera exposures and transforms applied to the video signals.

The signal output from input LUT 16 is provided to a neighborhood transform processor (NTP) 20 which is operative to reduce the low frequency portions of the video data and to perform an edge enhancement transform on the video data received from input LUT 16. Timing control circuitry 22 supplies timing control signals to camera timing circuitry 12, input LUT 16, NTP 20, and to additional circuitry which will be described hereinbelow. The timing control circuitry 22 is operative to step the camera through various exposure levels, i.e. sensitivities. Preferably it may operate adaptively, by sensing the saturation and cut off limits and beginning at an exposure level intermediate therebetween, as described hereinabove.

Considering now the operation and structure of the neighborhood transform processor (NTP), it may be appreciated that according to one preferred embodiment of the invention, the NTP carries out a linear convolution. In such an embodiment, the NTP may comprise an off-the-shelf, special purpose VLSI chip, such as Zoran ZR33481 or ZR33881 Digital Filter Chips and some additional components, for example, delay lines and delay buffers, such as described in Zoran Technical Note No. Z.T.N. 03 entitled "Real Time Spatial Filtering with a Zoran DFP".

A typical function of the neighborhood transform processor in the above-described embodiment is to compute a new output value for each input pixel on the basis of the input values of that pixel and its immediate neighbors. A typical kernel for this convolution may be as follows:

$$\begin{array}{ccc} -1 & -1 & -1 \\ -1 & 8+e & -1 \\ -1 & -1 & -1 \end{array}$$

where e is <1 and is determined heuristically. For example e may be set to be equal to 1/number of frames combined in a picture. Typically e=0.1 if the number of frames combined or the number of different exposure settings combined is equal to 10. The kernel and the value of e may be varied by the Host CPU 18.

The output of the NTP 20 is supplied to a combiner 24, which also receives an input from timing control circuitry 22. Combiner 24 combines the pixels from the neighborhood transform with the accumulated value stored for that pixel from previous frames in a frame buffer 26. The combiner may be embodied in a conventional adder, such as a 74F283 of Texas Instruments, which produces the sum of all successive frames, receives an input from the frame buffer 26 and stores the summed result in frame buffer 26.

Frame buffer 26 typically comprises a matrix of static or dynamic RAM chips having associated circuits for reading in the data for each pixel from combiner 24 to the appropriate address, for reading out the next pixel into the combiner, and for outputting the entire frame after the video data of all the required exposures has been combined. It may thus be appreciated that the frame buffer is zeroed before each new sequence begins and contains at any point during the process of collecting images at different exposures, a combination of pixel data collected up to that point through the various exposures already made.

When the process of collecting pixel data for all of the desired exposures is completed, the pixel data for the entire frame is output from the frame buffer 26 sequentially through an output Look Up Table (LUT) 28, which receives a control input from Host CPU 18 and may provide digital signal post processing, if required. Alternatively, the output LUT 28 may be eliminated.

The output of output LUT 28 is preferably supplied to a real time image enhancement processor (IEP) 30, such as a histogram equalizer, which is operative to smooth the distribution of gray levels or colors over the area of the image. A typical IEP is described in U.S. Pat. No. 4,450,482, the teaching of which is incorporated herein by reference. Alternatively, the IEP may be eliminated.

The output of IEP 30 is supplied to a frame memory 32, typically comprising a matric of RAMs which stores the enhanced, processed video image until a new image has been collected and processed. The frame memory 32 typically outputs via frame memory Look Up Table (LUT) 34 which permits further post processing to be carried out. The output of LUT 34 is supplied to a video generator 36, such as an off-the-shelf circuit including a D/A converter and timing circuits, such as an Analog Devices HDG-0807. The video generator receives synchronization pulses from a conventional sync generator 37, such as a ZNA134J, to enable the current video signal to be viewed continuously, independent of the subsequent frame processing. The video signal thus generated may be viewed on a standard video monitor 38. Additionally or alternatively, the digital output of LUT 34 may be supplied directly to a computer/image processor.

Figure 2:
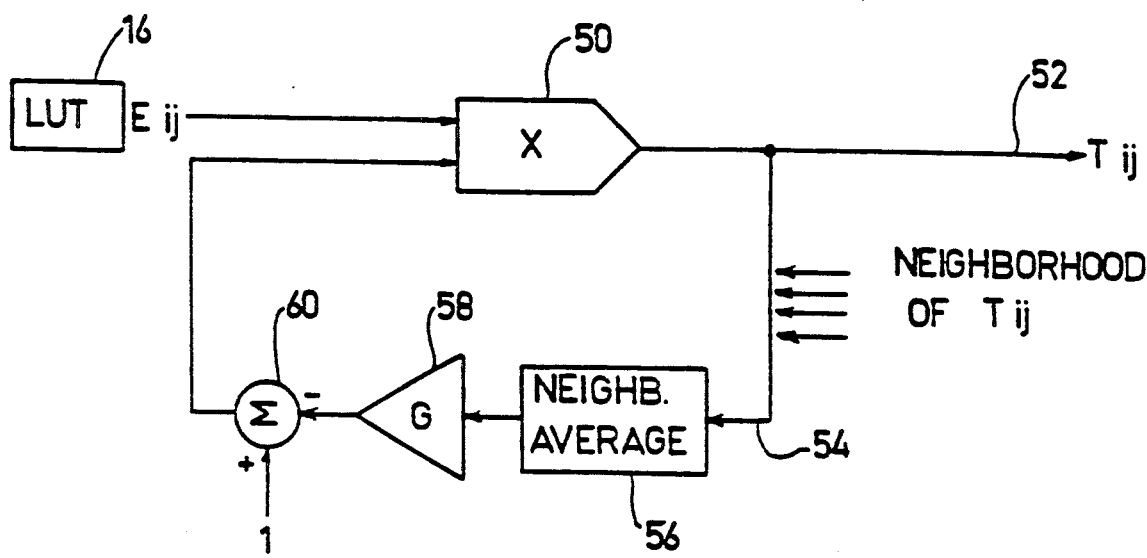
FIG. 2 is a simplified block diagram of neighborhood transform apparatus which provides a non-linear neighborhood transform.

Reference is now made to FIG. 2, which illustrates apparatus for providing a non-linear neighborhood transform which may be employed instead of NTP 20 (FIG. 1) and which includes a multiplier 50 which receives an output signal from the LUT 16 representing a pixel $E_{ij}$ and a neighborhood signal. The output of multiplier 50 is supplied to an output $T_{ij}$ 52. A neighborhood averaging circuit 56, which may be based on the Zoran ZR33481 or ZR33881 Digital Filter Chips as described above, which provides an output indication of the average intensity of the neighborhood around pixel ij. This average intensity may be computed by means of a convolution of, for example, a 3×3 neighborhood around pixel ij with the 3×3 kernel of all 1/9.

The output of circuit 56 is amplified by an amplifier 58, having an amplification G, and is supplied to a subtractor 60 which subtracts it from 1. The difference is supplied to multiplier 50 as the neighborhood signal.

The principle of operation of the circuitry of FIG. 2 is described in an article entitled VLSI Architecture for the Automatic Gain Control Image Processing Algorithm by Ron Riesenbach, Ran Ginosar and Alfred Bruckstein, 1987 (Proceedings of the 15th IEEE Convention in Israel, March, 1987), the disclosure of which is incorporated herein by reference, and may be summarized by the following expression:

$$T_{ij} = E_{ij}(1 - G(\text{Neighborhood Transform of } T_{ij}))$$

Figure 3:
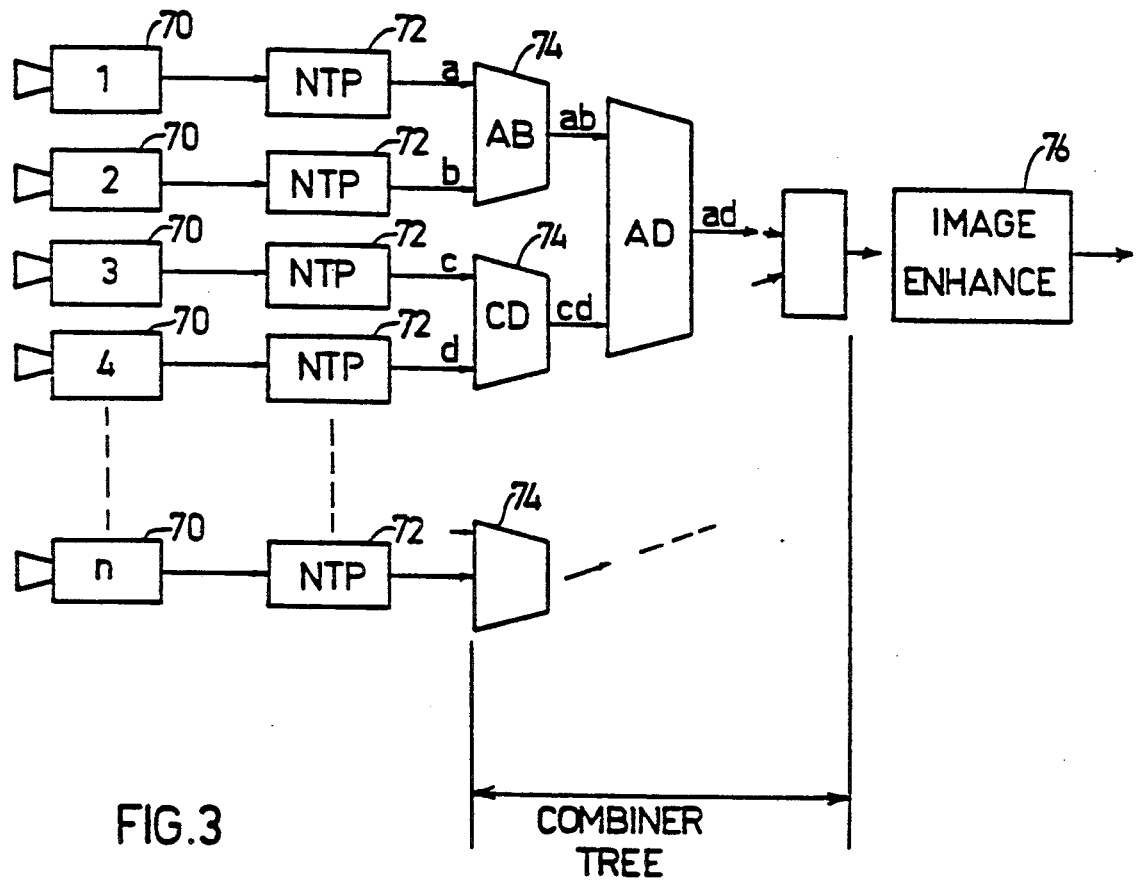
FIG. 3 is a block diagram illustration of an alternative video imaging system constructed and operative in accordance with an alternative preferred embodiment of the present invention.

Reference is now made to FIG. 3 which illustrates an alternative embodiment of the present invention wherein multiple cameras 70 are employed, each acquiring the same image at a different exposure level. Each camera generates a video signal which is supplied to a neighborhood transform processor (NTP) 72, which may be identical to NTP 20 described above or to that described in FIG. 2.

Preferably, all of the cameras 70 and NTPs 72 are synchronized so that they simultaneously produce outputs relating to the same pixel at different light sensitivities.

According to an alternative embodiment of the present invention, instead of having a plurality of cameras all boresighted and synchronized to shoot simultaneously, a plurality of cameras may be arranged in a row, along the direction of motion of a moving object to be viewed. The cameras fire in sequence, timed to shoot such that each one captures the object in the same position in the frame. If necessary, the timing of the images from the sequence of cameras can be adjusted after the images are captured, in order to achieve proper registration of all of the frames.

An embodiment of the type described above may be employed with a row of line array cameras to observe moving objects, such as assemblies on a production line or moving sheets or a moving web, thereby achieving more highly enhanced spatial resolution and speed than would be attainable from matrix array sensors.

The outputs of NTPs 72 are supplied to a plurality of first stage parallel combiner circuits 74, such as circuits employed in combiner 24 (FIG. 1), as described hereinabove. The outputs of combiner circuits 74 are combined in second and higher stage combiner circuits as necessary to produce a single combined video output, which is supplied to image enhancement circuitry 76 such as a histogram equalizer 30 (FIG. 1).

Figure 4:
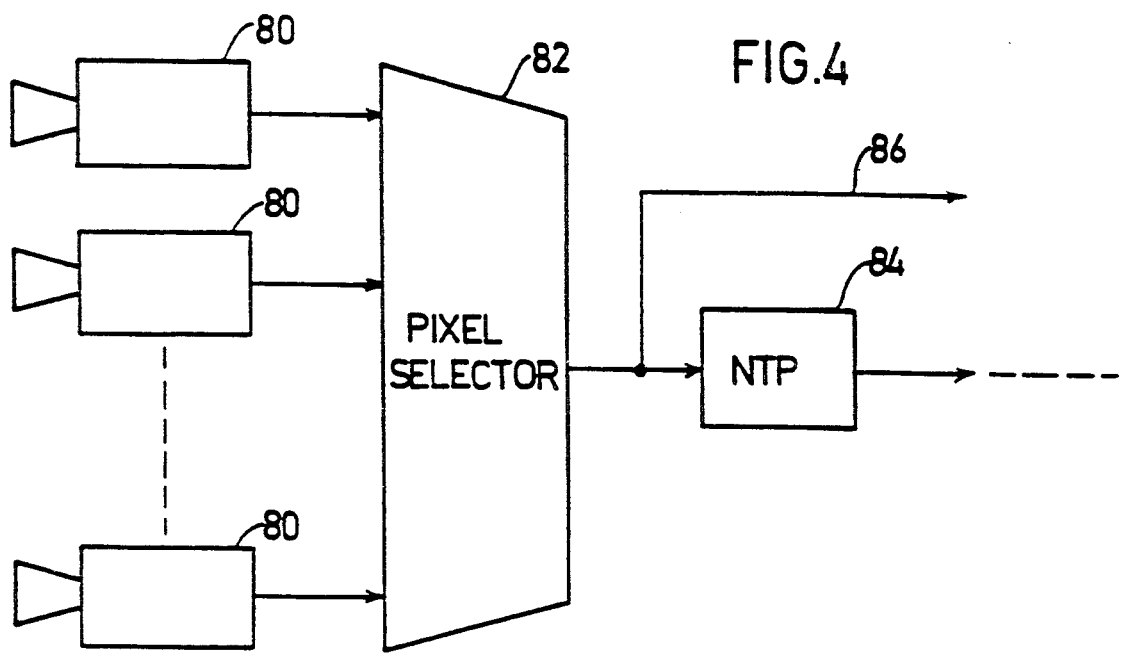
FIG. 4 is a block diagram illustration of a further video imaging system constructed and operative in accordance with an alternative preferred embodiment of the present invention.

Reference is now made to FIG. 4, which illustrates an alternative embodiment of video imaging system. Here, a plurality of cameras 80, each operative at a different exposure level or sensitivity, simultaneously acquires different versions of the same image at differing sensitivities. The video outputs of the cameras 80, which are all synchronized, are supplied to a pixel selector 82, which will be described hereinbelow.

The pixel selector is operative to provide a single output video signal having an extended dynamic range. For example, if each signal supplied to the pixel selector spans a 1:256 range (8 bits per pixel), the output of the pixel selector may span a range of 1:1,048,576 (20 bits per pixel). The output signal from the pixel selector 82 may be supplied to a neighborhood transform processor (NTP) 84, which may be identical to NTP 20, which reduces the dynamic range down to typically 1:256 (8 bits), while preserving substantial image contents and edge information. The output of NTP 84 may be supplied to image enhancement apparatus of the type described above, such as shown at reference numerals 28, 30 and 32 or employed without image enhancement as appropriate. Alternatively, the output of pixel selector 82 may be used in its full 20 bit format as an output 86.

The pixel selector employs a measurement correction algorithm based on the following:

Given a certain pixel $P_{ij}$ is being sensed by a plurality of n cameras, which produce n different outputs for the light intensity of $P_{ij}$. If the exposure settings of the plurality of cameras is set such that each camera k is set to receive exactly one half of the light entering camera k+1 for all k and assuming that the camera response to light is linear within a certain range, beyond which it is either saturated at high intensity or cuf-off at low intensity, then $$I_{ij}(k)+C=\tfrac{1}{2}I_{ij}(k+1)$$

where C is a constant offset term and $I_{ij}(k)$ is the intensity at pixel ij for camera k, provided that both values of I are within the linear range of responsivity of the cameras.

If some light intensity value $I_{ij}(m)$ is at or above the saturation value SAT, then $$I_{jk}(k)=(\text{approximately})\ SAT\ \text{for all}\ K=m, m+1 \ldots n.$$

If some light intensity value $I_{ij}(m)$ is at or below the cut-off value CUT, then $$I_{ij}(m)=(\text{approximately})\ CUT\ \text{for all}\ k=1,\ldots m-1, m.$$

Figure 5:
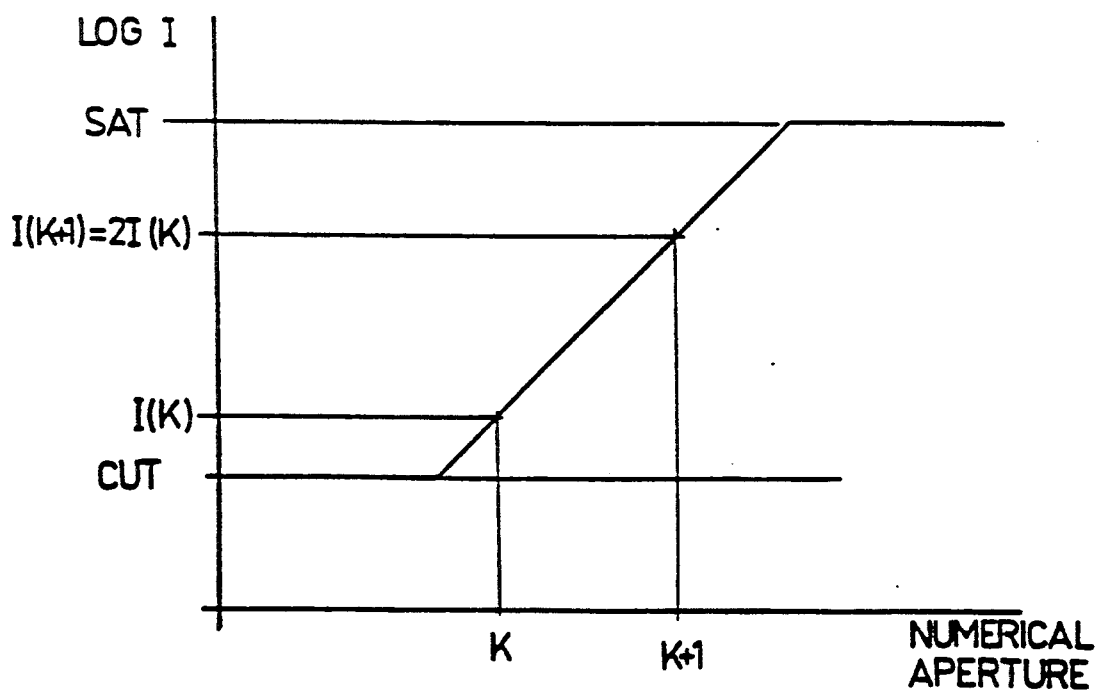
FIG. 5 is a graphical illustration of the operation of the video imaging system of FIG. 4.

Stated differently, the responsivity of the set of cameras to the light intensity of a given pixel is as shown in the graph of FIG. 5, which illustrates the aperture numerical aperture versus the Intensity $I_{ij}$ for a given single pixel $P_{ij}$.

Pixel selection circuitry which will be described hereinbelow is operative to search along the graph of FIG. 5 for each set of received pixel intensities $I_{ij}(1), I_{ij}(2) \ldots I_{ij}(n)$ and to look for any one point on the linear segment, for example, $I_{ij}(k)$ which comes from a camera k. It then transforms the intensity value $I_{ij}(k)$ to the equivalent intensity which would have been measured by camera n, if pixel $P_{ij}$ were not causing saturation at camera n.

The transformation is as follows:

$$I_{ij}(n)=I_{ij}(k)\times 2^{(n-k)}$$

The foregoing may be generalized for a light intensity relationship 1/R instead of $\tfrac{1}{2}$ by replacing 2 by R throughout the above discussion.

Figure 6:
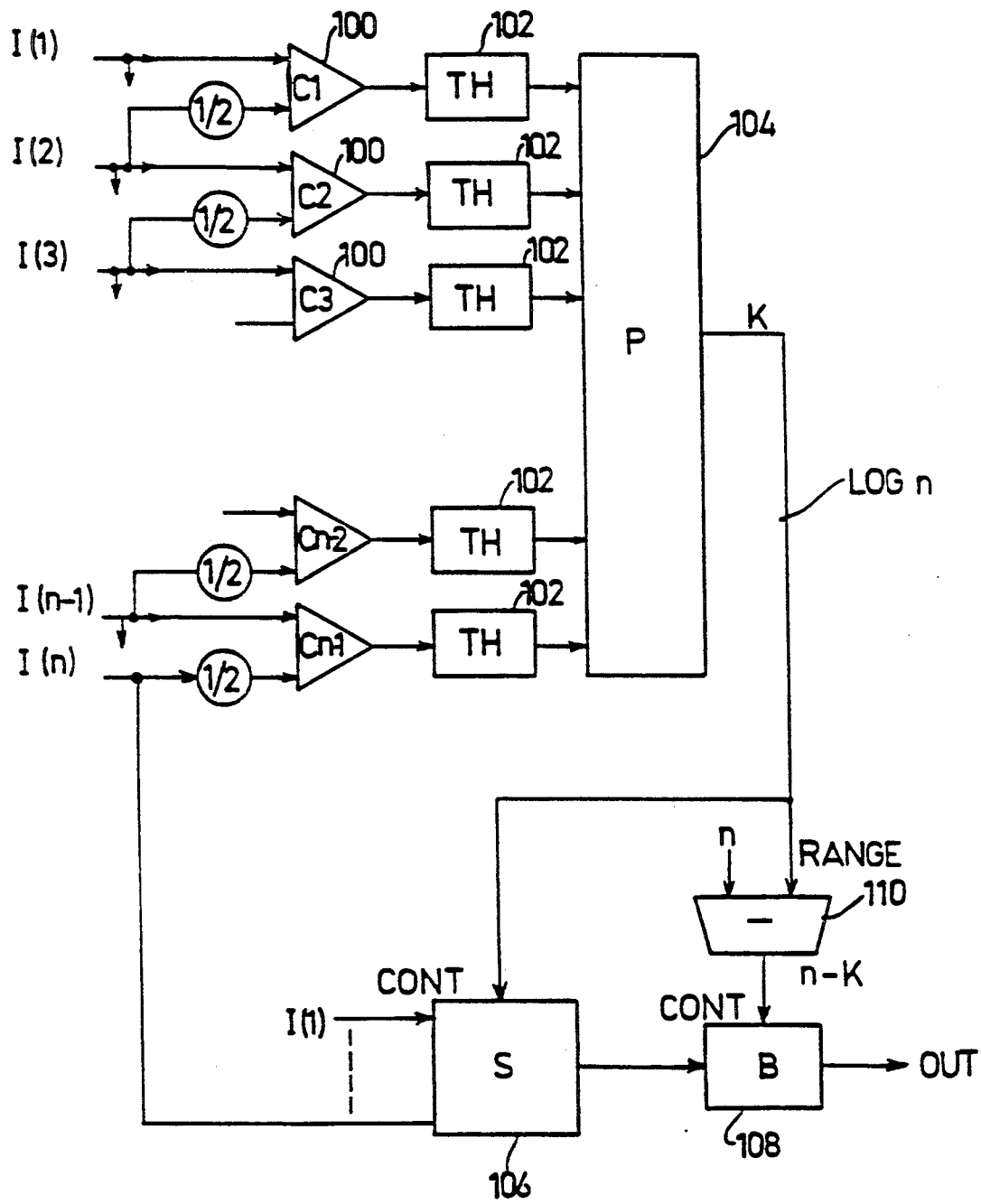
FIG. 6 is a block diagram illustration of a pixel selector useful in the embodiment of FIG. 5.

Reference is now made to FIG. 6 which illustrates a preferred embodiment of pixel selector 82 arranged for operation with a plurality of boresighted and/or mutually synchronized cameras. Each of a plurality of digital comparators 100, typically of conventional construction, compares a signal from a camera with a signal from another camera whose value is multiplied by 1/R in the general case or $\tfrac{1}{2}$ in the specific example employed above. The outputs of comparators 100 pass through threshold circuits 102, such as to a priority encoder circuit 104. The output of the priority encoder circuit 104 controls a selector 106 which selects one of the inputs I(l) . . . I(n) and supplies it to a barrel shifter circuit 108. The barrel shifter circuit 108 receives a control input from a subtractor circuit 110.

The operation of the circuitry of FIG. 6 will now be explained briefly. The threshold circuits 102 which receive the outputs from comparators 100 provide outputs to circuitry 104 only from those comparators receiving signals within the linear range. Thus signals from outside the linear range are eliminated. This occurs, because the comparator 100 output is relatively high when the two inputs thereto are nearly the same, and is much lower when there is a significant difference therebetween.

The priority encoder circuit selects one of the signals from the linear range and employs that signal for scaling the corresponding intensity I (k) by the factor $2^{(n-k)}$ as described above. Accordingly, the intensity output is unaffected by which camera records it. The priority encoder may be embodied in a TI SN 74148 chip.

Figure 7:
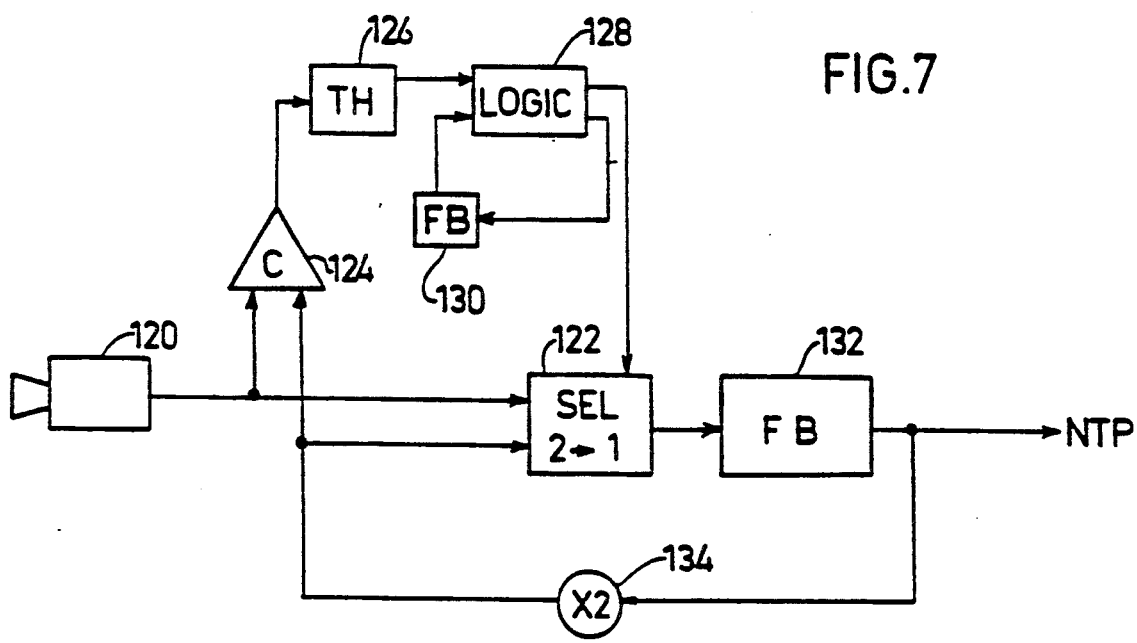
FIG. 7 is a block diagram illustration of yet a further alternative embodiment of a video imaging system constructed and operative in accordance with a preferred embodiment of the present invention.

Reference is now made to FIG. 7 which illustrates an alternative embodiment of image processor constructed and operative in accordance with an embodiment of the present invention. A single camera 120, provides an output to a 2 to 1 selector 122 and to a comparator 124. The output of the comparator passes through a threshold circuit 126, which outputs to combinational logic (CL) 128. The CL 128 outputs to a single bit per pixel frame buffer 130, which in turn outputs to the CL 128. The output of CL 128 is supplied as a control input to selector 122. The signal output from selector 122 is supplied via a frame buffer 132. The output from frame buffer 132 may be fed back via a multiply by two (or R) circuit 134 to the selector 122 and to comparator 124 and is supplied as an output signal to a neighborhood transform processor (NTP) such as NTP 84 in the embodiment of FIG. 4. The output from frame buffer 132 may also serve as the system output, thus providing a full dynamic range output.

The apparatus of FIG. 7 corresponds to that shown in FIG. 6 for the use of a single camera. The apparatus of FIG. 7 is operative to sweep the sensitivity range over multiple successive acquisitions of the same image. The sensitivity sweep typically starts at the lowest sensitivity, i.e. the shortest integration time, for k=1 and increases the sensitivity twofold in an exemplary case or R-fold in a generalized case, from one frame to the next until n frames are taken.

Accordingly, any given pixel may be in the cut-off region during the first few frames, then in the linear region, and then in the saturation region. Some pixels may be in only one or two of/the three possible regions throughout the process (e.g. always saturated, or never saturated.)

At the outset frame buffer 130 is set to all zeros. When a pixel intensity $I_{ij}(k)$ of the k'th image is output by the camera, it is compared with twice the value already stored in the frame buffer 132 of the same pixel ij by reading that value out and shifting it to the left by one bit (i.e. thus multiplying it by 2). If the values are different by more than a given predetermined tolerance level, indicating that the given pixel is still in the cut-off region, then the old value, already multipled by two, is stored in the frame buffer 132. Otherwise, for example, if the pixel is in the linear region, the new value is stored and the i,j bit of frame buffer 130 is set to one.

Once the i,j bit of frame buffer 130 has been set to one, the decision is reversed. If the values are within a given predetermined tolerance, indicating that the pixel is in the linear region, then the new value is stored in the frame buffer. Otherwise, for example, if the pixel has reached saturation, the old value, already multiplied by two, is stored.

After all n frames are examined, the value stored for each pixel is the last one of the linear region, shifted left, (i.e. multipled by 2,) the appropriate number of times. Thus all pixel intensities correspond to the computed value taken by a non-existing large dynamic range camera, operating at the sensitivity level of camera n.

It will be appreciated by persons skilled in the art that the present invention is not limited by what has been particularly shown and described hereinabove. Rather the scope of the invention is defined only by the claims which follow:

We claim:

1. Wide dynamic range video imaging apparatus comprising:
    sensor means for providing a plurality of video images of a scene at different exposure levels; and
    means for processing the plurality of video images to produce a combined video image including image information from the plurality of video images by applying neighborhood transforms to the plurality of video images.

2. The video imaging apparatus of claim 1, wherein the means to process the plurality of video images comprises means for locally selecting the operating levels of the dynamic range of the combined video image within the dynamic range of the sensor means, whereby the resulting video image includes image information from a plurality of video images with enhanced information content at local areas therein.

3. The video imaging apparatus of claim 1, wherein said means for processing the plurality of video images comprises means for highlighting edges in the combined video image.

4. The video imaging apparatus of claim 1, wherein said means for providing a plurality of video images comprises a single camera sequentially operated at a plurality of different exposure levels.

5. The video imaging apparatus of claim 1, wherein said means for providing a plurality of video images comprises a plurality of cameras each operating at a different exposure level.

6. The video imaging apparatus of claim 1, wherein said means for processing also comprises image enhancement means.

7. The video imaging apparatus of claim 6, wherein said image enhancement means comprises histogram equalization means.

8. The video imaging apparatus of claim 1, wherein the sensors can be area sensors or line sensors.

9. Wide dynamic range video imaging apparatus comprising:
    means for receiving a plurality of video images of a scene at different exposure levels; and
    means for processing the plurality of video images to produce a combined video image including image information from the plurality of video images by applying neighborhood transforms to the plurality of video images.

10. Wide dynamic range video imaging apparatus comprising:
    sensor means for providing a plurality of video images of a scene at different exposure levels; and
    means for processing the plurality of video images to produce a combined video image including image information from the plurality of video images by applying neighborhood transforms to the plurality of video images, said means comprising means for locally selecting the operating levels of the dynamic range of the combined video image within the dynamic range of the sensor means, whereby the resulting video image includes image information from the plurality of video images with enhanced information content at local areas therein.

* * * * *

UNITED STATES PATENT AND TRADEMARK OFFICE
CERTIFICATE OF CORRECTION

PATENT NO. : 5,144,442

DATED : September 1, 1992

INVENTOR(S) : Ran Ginosar, et. al.

It is certified that error appears in the above-identified patent and that said Letters Patent is hereby corrected as shown below:

On the Title page, item [30], the date "Feb. 8, 1988" should read -- Aug. 2, 1988 --.

On the Title page, item [63], "338,547" should read -- 388,547 --.

Signed and Sealed this

Ninth Day of November, 1993

*Attest:*

BRUCE LEHMAN

*Attesting Officer*     *Commissioner of Patents and Trademarks*